US010139488B2

(12) United States Patent
Hama

(10) Patent No.: US 10,139,488 B2
(45) Date of Patent: Nov. 27, 2018

(54) MEASUREMENT APPARATUS, MEASUREMENT SYSTEM, PROGRAM AND CONTROL METHOD

(71) Applicant: NEC Corporation, Minato-ku, Tokyo (JP)

(72) Inventor: Yoshinori Hama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 546 days.

(21) Appl. No.: 14/751,414

(22) Filed: Jun. 26, 2015

(65) Prior Publication Data
US 2015/0378020 A1    Dec. 31, 2015

(30) Foreign Application Priority Data

Jun. 26, 2014 (JP) .................... 2014-131324

(51) Int. Cl.
G01S 15/58 (2006.01)
G01S 15/87 (2006.01)
G01S 15/02 (2006.01)

(52) U.S. Cl.
CPC ............ G01S 15/58 (2013.01); G01S 15/025 (2013.01)

(58) Field of Classification Search
CPC ............................... G01S 15/58; G01S 15/025
USPC ............................................................ 367/91
See application file for complete search history.

(56) References Cited

U.S. PATENT DOCUMENTS 3,707,717 A * 12/1972 Frielinghaus ............. G01S 1/02
342/109
5,206,652 A * 4/1993 Hoyt ....................... G01S 15/10
342/52
2002/0036953 A1    3/2002 Isomichi et al.
2016/0202343 A1    7/2016 Okutsu

FOREIGN PATENT DOCUMENTS

JP        167577 C    * 10/1942
JP        167577 B     10/1944
JP    H07-038067 Y2    7/1990
JP    H07-209414 A     8/1995
JP    H10-048309 A     2/1998

(Continued)

OTHER PUBLICATIONS

"Base and application of marine acoustics", Marine Acoustics Society of Japan, 2004, Chapter 19, pp. 236-245 (total 11 pages).

(Continued)

Primary Examiner — Daniel L Murphy

(57) ABSTRACT

The present invention provides a new art for grasping a moving direction of an underwater vehicle. In order to grasp the moving direction of the underwater vehicle, a measurement apparatus 2000 is installed in an underwater vehicle 4000. An electromagnetic wave receiving unit 2020 receives an electromagnetic wave signal, which a signal outputting apparatus 3000 outputs with a first frequency, in the water. A sound receiving unit 2040 receives a sound signal, which the signal outputting apparatus 3000 outputs with a second frequency, in the water. A frequency calculating unit 2050 calculates a frequency of the electromagnetic wave signal which the electromagnetic wave receiving unit 2020 receives, and a frequency of the sound signal which the sound receiving unit 2040 receives.

20 Claims, 14 Drawing Sheets

(56) References Cited

FOREIGN PATENT DOCUMENTS

| JP | 2002-055154 A | 2/2002 |
|----|---------------|---------|
| JP | 2006194707 A | 7/2006 |
| JP | 2006213265 A | 8/2006 |
| JP | 2009200772 A | 9/2009 |
| JP | 2012-117850 A | 6/2012 |
| JP | 2013-238828 A | 11/2013 |
| JP | 2016-128765 A | 7/2016 |

OTHER PUBLICATIONS

Japanese Office Action for JP Application No. 2014-131324 dated Apr. 3, 2018 with English Translation.

* cited by examiner

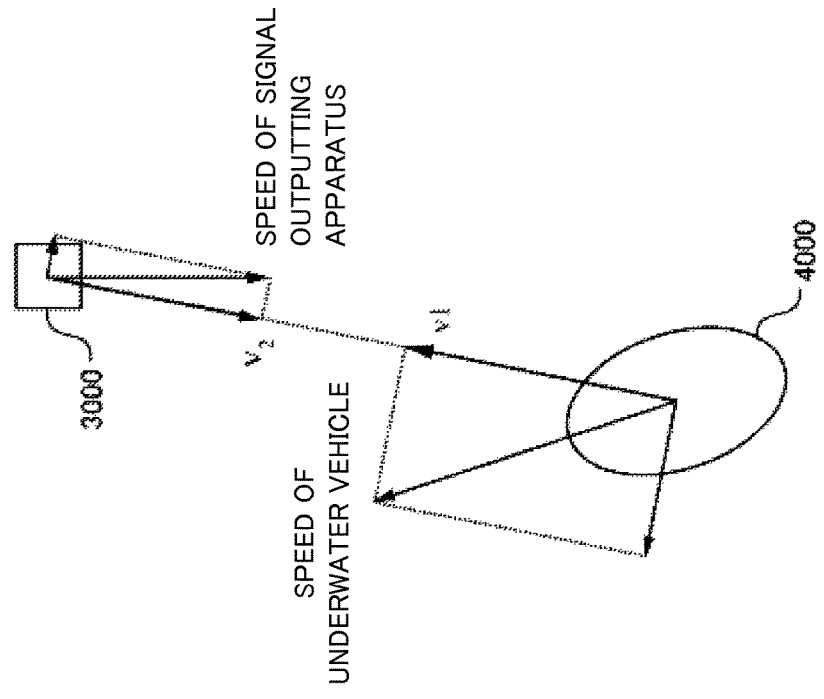
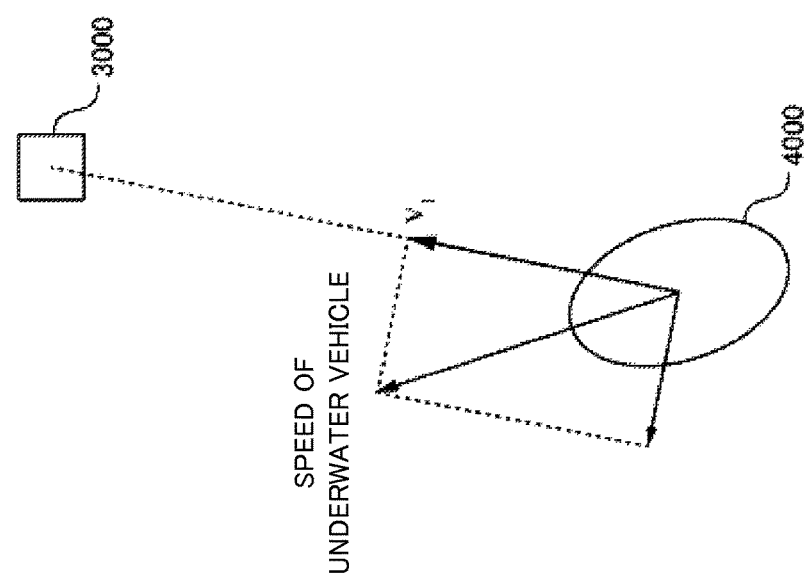

_US 10,139,488 B2_

MEASUREMENT APPARATUS, MEASUREMENT SYSTEM, PROGRAM AND CONTROL METHOD

This application is based upon and claims the benefit of priority from Japanese Patent Application No. 2014-131324, filed on Jun. 26, 2014, the disclosure of which is incorporated herein in its entirety by reference.

TECHNICAL FIELD

The present invention relates to a measurement apparatus, a measurement system, a program and a control method.

BACKGROUND ART

To measure a position of an underwater vehicle (UUV (Unmanned Underwater Vehicle) or the like) which moves in the water is carried out. To measure the position includes to measure a distance (distance measurement) to a target, etc. In general, a sound signal is used for measuring the position. The reason is that the sound signal has smaller propagation loss in the water than another signal such as an electromagnetic wave signal has.

The distance measurement using the sound signal is carried out by measuring a propagation time (refer to NPL 1). Therefore, equipment, which is called the responder, is installed in the vehicle. The responder receives a sound signal which is sent by a target, and sends back a sound signal to the target. Then, a propagation time, which is defined as a period of time from the target's sending the sound signal until the target's receiving the sound signal which is sent back, is measured, and a distance between the target and the vehicle is calculated by use of the propagation time and a propagation speed of the sound signal.

Moreover, to develop an art, which uses not only the sound signal but also an electromagnetic wave signal for the distance measurement, has been started. For example, PTL1 discloses an art that, on the basis of a difference between a propagation time taken when a sound signal propagates from a point 1 to a point 2, and a propagation time taken when an electromagnetic signal propagates from the point 1 to the point 2, a distance between the point 1 and the point 2 is calculated.

Moreover, as a related art which uses the electromagnetic wave signal, PTLs 2 to 4 disclose an art that the electromagnetic wave signal is used for information transmission in the water.

CITATION LIST

Patent Literature

[PTL 1] Japanese Patent Application Laid-Open Publication No. 2006-194707
[PTL 2] Japanese Patent Application Laid-Open Publication No. 2006-213265
[PTL 3] Japanese Patent Application Laid-Open Publication No. 2009-200772
[PTL 4] Japanese Examined Utility Model Application Publication No. 07-038067

Non Patent Literature

[NPL 1] 'Base and application of marine accoustics', Marine Acoustics Society of Japan, 2004

SUMMARY

Technical Problem

In order to control movement of a underwater vehicle, it is necessary to observe the movement of the underwater vehicle. The present inventor investigates a new method for grasping a moving direction of the underwater vehicle.

The present invention is conceived in consideration of the above-mentioned problem. An object of the present invention is to provide a new art for grasping the moving direction of the underwater vehicle.

Solution to Problem

A measurement apparatus which the present invention provides is a measurement apparatus which is installed in the underwater vehicle. The measurement apparatus includes: an electromagnetic wave receiving means to receive an electromagnetic wave signal, which a signal outputting apparatus outputs into the water with a first frequency, in the water; a sound receiving means to receive a sound signal, which the signal outputting apparatus outputs into the water with a second frequency, in the water; a frequency calculating means to calculate a frequency of the electromagnetic wave signal which is received by the electromagnetic wave receiving means, and a frequency of the sound signal which is received by the sound receiving means; and a relative speed calculating means to calculate a relative speed of the underwater vehicle toward the signal outputting apparatus on the basis of a relation between the first frequency and the second frequency, and the frequencies of the electromagnetic wave signal and the sound signal which are calculated by the frequency calculating means.

A measurement system, which the present invention provides, includes a signal outputting apparatus, and the measurement apparatus which is provided by the present invention. The signal outputting apparatus includes: an electromagnetic wave outputting means which outputs an electromagnetic wave signal into the water with a first frequency; and a sound outputting means which outputs a sound signal into the water with a second frequency.

A program, which the present invention provides, is a program for making a computer work as the measurement apparatus which the present invention provides.

A control method, which the present invention provides, is carried out by a measurement apparatus which is installed in an underwater vehicle.

The measurement apparatus includes: an electromagnetic wave receiving means which receives an electromagnetic wave signal in the water; and a sound receiving means which receives a sound signal in the water.

The control method includes: an electromagnetic wave receiving step in which the electromagnetic wave receiving means receives an electromagnetic wave signal, which a signal outputting apparatus outputs into the water with a first frequency, in the water; a sound receiving step in which the sound receiving means receives a sound signal, which the signal outputting apparatus outputs into the water with a second frequency, in the water; a frequency calculating step in which a frequency of the electromagnetic wave signal received in the electromagnetic wave receiving step, and a frequency of the sound signal received in the sound receiving step are calculated; and a relative speed calculating step in which a relative speed of the underwater vehicle toward the signal outputting apparatus is calculated on the basis of a relation between the first frequency and the second frequency, and the frequencies of the electromagnetic wave signal and the sound signal which are calculated in the frequency calculating step.

Advantageous Effects of Invention

According to the present invention, it is possible to provide the new art for grasping the moving direction of the underwater vehicle.

BRIEF DESCRIPTION OF DRAWINGS

FIG. 2A and FIG. 2B are diagrams showing conceptually a relative speed of an underwater vehicle toward a signal outputting apparatus;

DESCRIPTION OF EMBODIMENTS

Hereinafter, an exemplary embodiment of the present invention will be explained with reference to a drawing. In every drawing, the same component is assigned the same code, and explanation on the same component is omitted appropriately.

Exemplary Embodiment

Exemplary Embodiment 1

Figure 1:
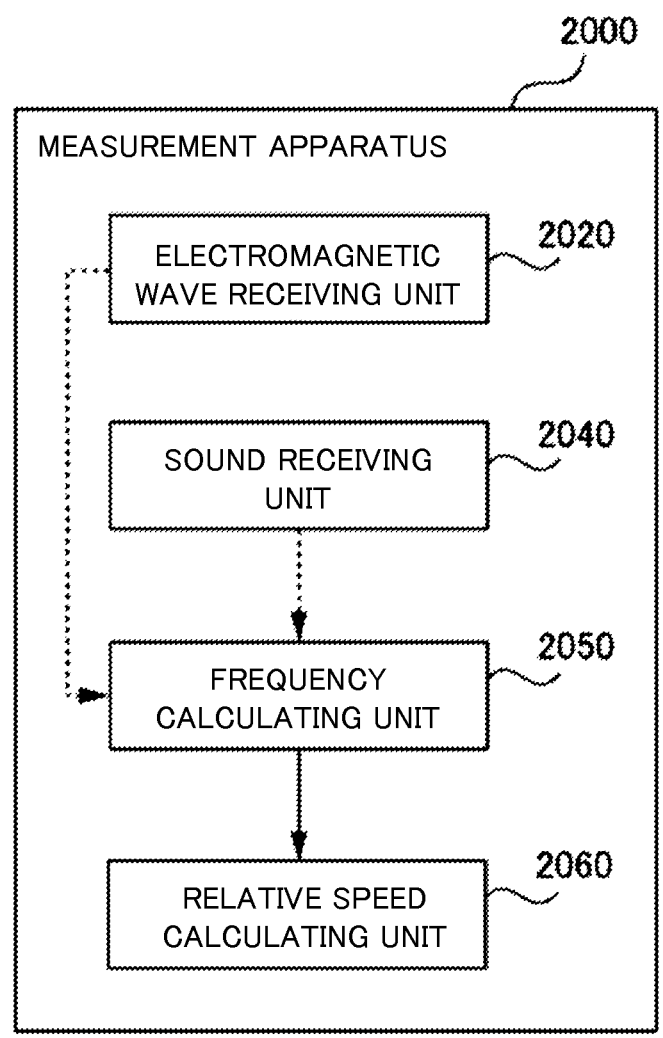
FIG. 1 is a block diagram exemplifying a measurement apparatus according to an exemplary embodiment 1.

FIG. 1 is a diagram exemplifying a measurement apparatus 2000 according to an exemplary embodiment 1. In FIG. 1, a direction of an arrow written in a solid line indicates a flow of information, and a direction of an arrow written in a dotted line indicates a flow of signal. Furthermore, in FIG. 1, each block indicates a component not in an unit of hardware but in an unit of function.

The measurement apparatus 2000 is installed in an underwater vehicle 4000 which moves in the water. 'Underwater' which is used here may mean to be under fresh water of a lake or the like, and may mean to be under salty water of the sea or the like. The measurement apparatus 2000 receives an electromagnetic wave signal and a sound signal which a signal outputting apparatus 3000 outputs into the water. Then, the measurement apparatus 2000 calculates a relative speed of the underwater vehicle 4000 toward the signal outputting apparatus 3000 on the basis of the electromagnetic wave signal and the sound signal which are received.

Here, the relative speed of the underwater vehicle 4000 toward the signal outputting apparatus 3000 means a speed component, which is directed toward the signal outputting apparatus 3000 when observing from the signal outputting apparatus 3000, out of a speed of the underwater vehicle 4000. FIG. 2A and FIG. 2B are diagrams showing conceptually the relative speed of the underwater vehicle 4000 toward the signal outputting apparatus 3000. FIG. 2A indicates a case that the signal outputting apparatus 3000 stops. In FIG. 2A, the speed component, which is directed toward the signal outputting apparatus 3000, out of the speed of the underwater vehicle 4000 is expressed as a vector v1. Since the signal outputting apparatus 3000 stops, the relative speed in FIG. 2A is equal to v1.

FIG. 2A indicates a case that the signal outputting apparatus 3000 moves. Here, the speed component, which is directed toward the signal outputting apparatus 3000, out of the speed of the underwater vehicle 4000 is expressed as a vector v2. Accordingly, a relative speed of the underwater vehicle 4000 toward the signal outputting apparatus 3000 is expressed as (v1−v2), in the case of FIG. 2A. For example, in the case that a direction of the vector v1 is defined as a positive direction, the vector v2 is a negative vector. As a result, the relative speed of the underwater vehicle 4000 toward the signal outputting apparatus 3000 is equal to a sum of largeness of the vector v1 and largeness of the vector v2.

The measurement apparatus 2000 includes an electromagnetic wave receiving unit 2020, a sound receiving unit 2040, a frequency calculating unit 2050 and a relative speed calculating unit 2060. The electromagnetic wave receiving unit 2020 receives an electromagnetic wave signal, which the signal outputting apparatus 3000 outputs with a first frequency, in the water. The sound receiving unit 2040 receives a sound signal, which the signal outputting apparatus 3000 outputs with a second frequency, in the water. The frequency calculating unit 2050 calculates a frequency of the electromagnetic wave signal which the electromagnetic wave receiving unit 2020 receives, and a frequency of the sound signal which the sound receiving unit 2040 receives. The relative speed calculating unit 2060 calculates the relative speed of the underwater vehicle 4000 toward the signal outputting apparatus 3000. Specifically, the relative speed calculating unit 2060 calculates the relative speed on the basis of a relation between the first frequency and the second frequency, and on the basis of the electromagnetic wave signal and the sound signal which are calculated by the frequency calculating unit 2050.

<Flow of Processes>

Figure 3:
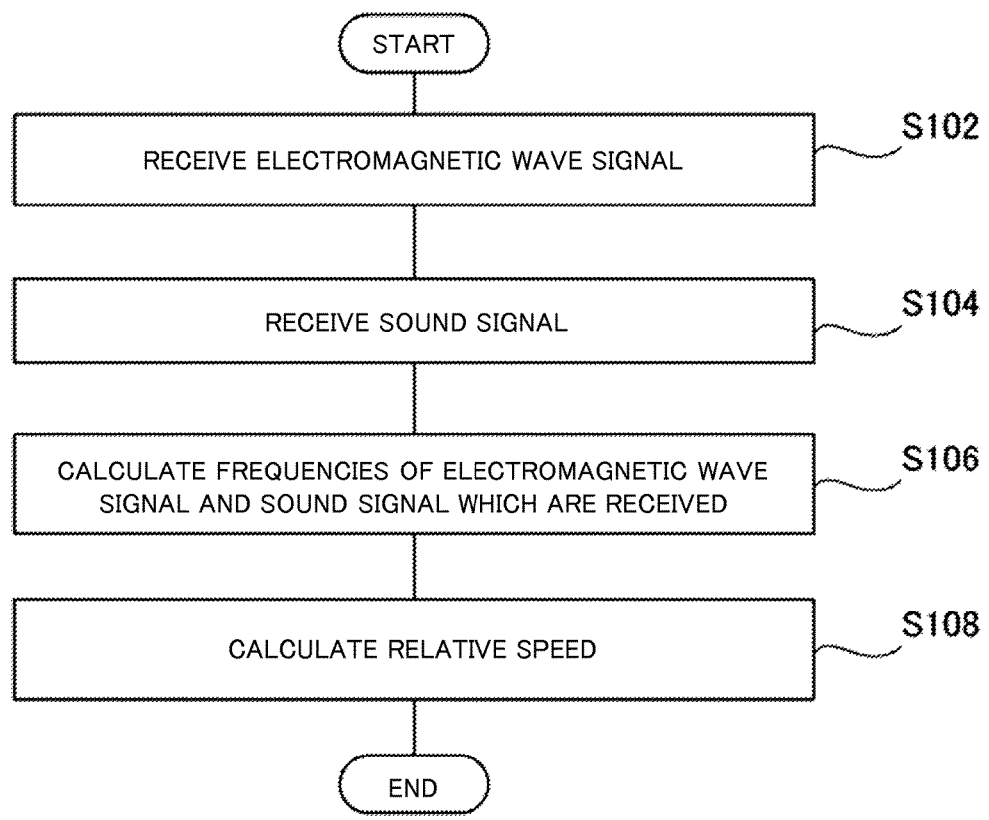
FIG. 3 is a flowchart showing a flow of processes which is carried out by the measurement apparatus of the exemplary embodiment 1.

FIG. 3 is a flowchart showing a flow of processes which is carried out by the measurement apparatus 2000 of the exemplary embodiment 1. In step S102, the electromagnetic wave receiving unit 2020 receives the electromagnetic wave signal. In step S104, the sound receiving unit 2040 receives the sound signal. In step S106, the frequency calculating unit 2050 calculates the frequency of the electromagnetic wave signal which the electromagnetic wave receiving unit 2020 receives, and the frequency of the sound signal which the sound receiving unit 2040 receives. In step S108, the relative speed calculating unit 2060 calculates the relative speed.

Here, a flow of processes which the measurement apparatus 2000 carries out is not limited to the flow shown in FIG. 3.

For example, there is a case that an order of Step S102 and Step S104 is reversed. Moreover, the frequency calculating unit 2050 may calculate the frequency of the electromagnetic wave signal before carrying out Step S104.

<Work and Effect>

According to the present exemplary embodiment, it is possible to calculate the relative speed of the underwater vehicle 4000 toward the signal outputting apparatus 3000 by use of the electromagnetic wave signal and the sound signal. Then, the measurement apparatus 2000 recognizes a state of movement of the underwater vehicle 4000 toward the signal outputting apparatus 3000 on the basis of the relative speed of the underwater vehicle 4000. For example, in the case that the relative speed of the underwater vehicle 4000 toward the signal outputting apparatus 3000 has a positive value, it is recognized that the underwater vehicle 4000 moves so as to approach the signal outputting apparatus 3000. On the other hand, in the case that the relative speed has a negative value, the underwater vehicle 4000 moves so as to recede from the signal outputting apparatus 3000.

Moreover, the relative speed of the underwater vehicle 4000 toward the signal outputting apparatus 3000 is changed according to an angle between a moving direction of the underwater vehicle 4000 and a direction of the signal outputting apparatus which is viewed from the underwater vehicle 4000. In the case that the underwater vehicle 4000 moves at a constant speed, as the angle between the moving direction of the underwater vehicle 4000, and the direction of the signal outputting apparatus 3000 becomes small, a difference between the speed of the underwater vehicle 4000, and the calculated relative speed becomes small. As mentioned above, according to the measurement apparatus 2000 of the present exemplary embodiment, it is recognized whether the underwater vehicle 4000 approaches the signal outputting apparatus 3000 or recedes from the signal outputting apparatus 3000. Furthermore, by comparing the speed of the underwater vehicle 4000 and the calculated relative speed, it is possible to recognize a degree of the underwater vehicle 4000's approaching the signal outputting apparatus 3000 and a degree of the underwater vehicle 4000's receding from the signal outputting apparatus 3000. Accordingly, it is possible to control the movement of the underwater vehicle 4000 accurately by use of the measurement apparatus 2000. Here, since the measurement apparatus 2000 is installed in the underwater vehicle 4000, it is possible for the measurement apparatus 2000 to acquire the speed of the underwater vehicle 4000 from a speedometer of the underwater vehicle 4000 or the like.

For example, the signal outputting apparatus 3000 is installed in a platform (mother ship or the like) of the underwater vehicle 4000. The underwater vehicle 4000 returns to the mother ship in order to charge a battery, etc. In order to check whether approaching the platform or not, it is necessary for the conventional underwater vehicle 4000 to carry out data transmission with the platform by use of a method of the underwater communication or the like, and to share absolute position information or the like with the platform.

By using the measurement apparatus 2000 of the present exemplary embodiment, without carrying out the data transmission with the platform, the underwater vehicle 4000 can recognize whether the underwater vehicle 4000 approaches the platform or not. Here, it is conceivable that power consumption required for an analysis on the signal frequency which is carried out by the measurement apparatus 2000 is small in comparison with power consumption required for the data transmission. Moreover, it is unnecessary for the measurement apparatus 2000 to have a signal sending function. Therefore, it is possible to reduce power consumption of the measurement apparatus 2000, and consequently it is possible to lengthen a working time of the underwater vehicle 4000. As a result, it is possible to reduce frequency of charging the battery of the underwater vehicle 4000. Furthermore, it is possible to lengthen a life of the battery. Moreover, since it is unnecessary for the measurement apparatus 2000 to have the signal sending function, it is possible to reduce a cost for manufacturing the measurement apparatus 2000, and to miniaturize the measurement apparatus 2000.

Hereinafter, the present exemplary embodiment will be explained in further detail.

<Properties of Electromagnetic Wave Signal and Properties of Sound Signal>

A difference between properties of the electromagnetic wave signal and properties of the sound signal will be explained in the following. A propagation speed of the electromagnetic wave signal in the water is determined on the basis of the permittivity and the conductivity. Meanwhile, a propagation speed of the sound signal in the water is determined on the basis of the density and the volume elastic-modulus. Since the propagation speeds are determined on the basis of different physical parameters, a degree of influence due to a marine environment is different. It is known that, in general, attenuation of the electromagnetic wave signal is severe in the water due to influence of the conductivity, but the electromagnetic wave signal having a quite low frequency is propagated by some distance.

Moreover, in general, the propagation speed of the electromagnetic wave signal in the sea water is one ninth of $3 \times 10^8$ [m/sec] which is a propagation speed in the vacuum or in the air. Meanwhile, the propagation speed of the sound signal in the water is 4.5 times larger than 340 [m/sec] which is a propagation speed in the air. Accordingly, in the water, the propagation speed of the electromagnetic wave signal is $2 \times 10^4$ times faster than the propagation speed of the sound signal.

Usually, a maximum speed of the underwater vehicle is about 5 knots (2.5 [m/sec]), and a maximum speed of an aquatic vehicle is about 50 knots ([25 [m/sec]). In the case that these vehicles receive the sound signal which is propagated in the water, Doppler, which is about 17% of the propagation speed of the sound signal in the water, is generated.

On the other hand, in the case that these vehicles receive the electromagnetic wave signal which is propagated in the water, Doppler, which is generated in this case, is small to be about $1 \times 10^{-4}$%. Therefore, it is conceivable that influence of the Doppler Effect on the electromagnetic wave signal can be neglected.

<Details of Relative Speed Calculating Unit 2060>

A specific method, with which the relative speed calculating unit 2060 calculates the relative speed of the underwater vehicle 4000 toward the signal outputting apparatus 3000, will be explained in the following. As mentioned above, the frequency of the sound signal received by the underwater vehicle 4000, which is moving, suffers from influence of the Doppler Effect. Therefore, the frequency of the received sound signal is different from the frequency of the sound signal which the signal outputting apparatus 3000 outputs. The influence of the Doppler Effect is determined on the basis of the relative speed of the underwater vehicle 4000, which receives the sound signal, toward the signal outputting apparatus 3000 which outputs the sound signal. Therefore, the relative speed calculating unit 2060 can calculate the relative speed of the underwater vehicle 4000 toward the signal outputting apparatus 3000 on the basis of a difference between the frequency of the sound signal which the signal outputting apparatus 3000 outputs, and the frequency of the sound signal which the underwater vehicle 4000 receives.

Since the electromagnetic wave signal received by the underwater vehicle 4000, which is moving, suffers from the small influence of the Doppler Effect as mentioned above, it is possible to neglect the influence. Therefore, the relative speed calculating unit 2060 can judge that the frequency of the electromagnetic wave signal which the electromagnetic wave receiving unit 2020 receives, and the frequency of the electromagnetic wave signal which the signal outputting apparatus 3000 outputs are identical to each other. Accordingly, by calculating the frequency of the electromagnetic wave signal which the electromagnetic wave receiving unit 2020 receives, the relative speed calculating unit 2060 can calculate the frequency of the electromagnetic wave signal which the signal outputting apparatus 3000 outputs.

Furthermore, by grasping beforehand a relation between the frequencies of the sound signal and the electromagnetic wave signal which are outputted by the signal outputting apparatus 3000, the relative speed calculating unit 2060 can calculate the frequency of the sound signal, which the signal outputting apparatus 3000 outputs, on the basis of the calculated frequency of the electromagnetic wave signal Then, by use of each of the calculated frequencies, the relative speed calculating unit 2060 can calculate the relative speed of the underwater vehicle 4000 toward the signal outputting apparatus 3000.

Specific Example

A specific example of a flow with which the relative speed calculating unit 2060 calculates the relative speed will be explained in the following. Here, the frequencies of the sound signal and the electromagnetic wave signal, which the signal outputting apparatus 3000 outputs, are denoted as fs1 and fe1 respectively. Moreover, the frequencies of the sound signal and the electromagnetic wave signal, which the measurement apparatus 2000 receives, are denoted as fs2 and fe2 respectively. Here, fs2 and fe2 have values which can be calculated on the basis of each signal received by the measurement apparatus 2000.

Figure 4:
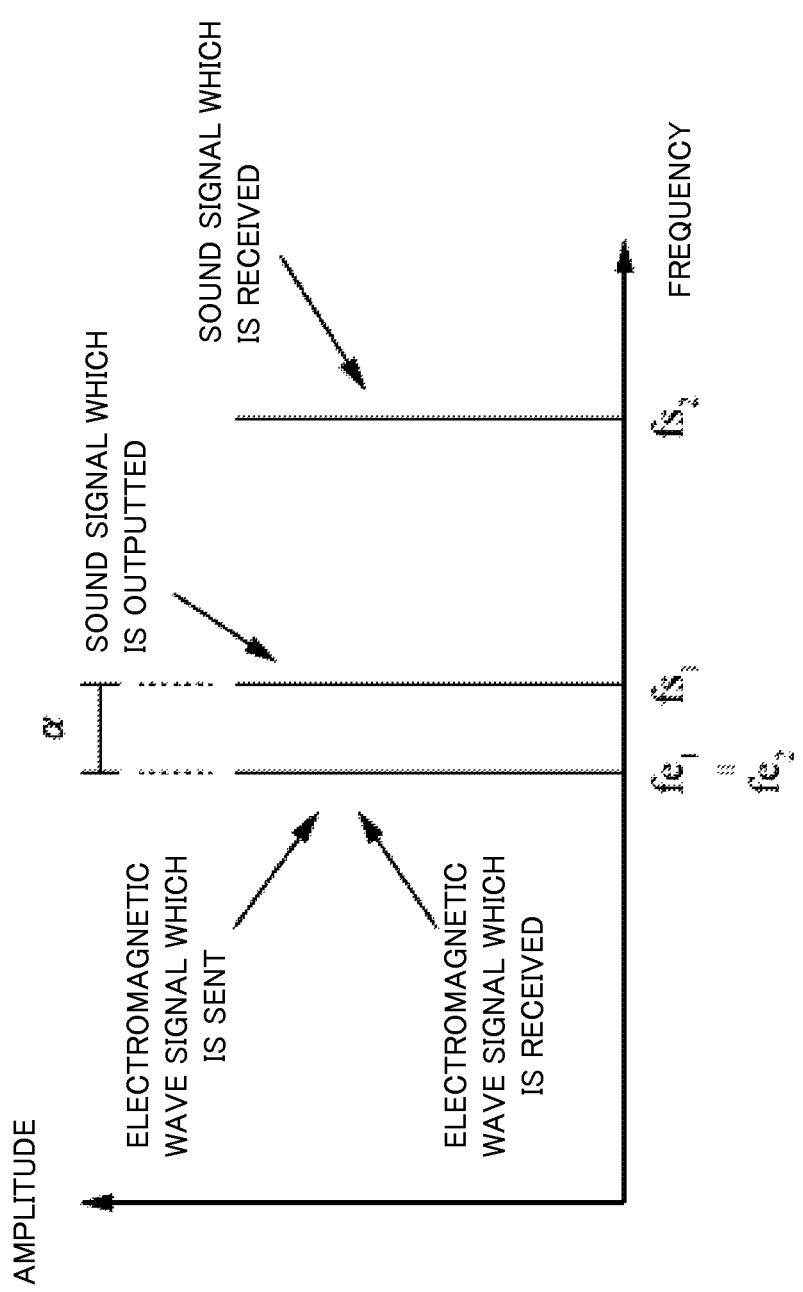
FIG. 4 is a diagram showing a relation between frequencies in a form of graph.

FIG. 4 is a diagram showing the relation between the frequencies in a form of graph. The X axis and the Y axis indicate a frequency, and an amplitude respectively.

While each signal in FIG. 4 has the same amplitude, it is unnecessary for each signal to have the same amplitude.

The relative speed calculating unit 2060 grasps a relation between fs1 and fe1 in advance. It is assumed that, for example, the relation between fs1 and fe1 which the relative speed calculating unit 2060 grasps is expressed as the following formula (1), where a is any real number. But, it is enough as far as the relative speed calculating unit 2060 can calculate fe1 on the basis of fs1, and a way of expressing a relation between fs1 and fe1 is not limited to the way of expressing the relation by use of subtraction like the formula (1).

$$fs_1 - fe_1 = \alpha \qquad (1)$$

Since the electromagnetic wave signal suffers from the small influence of the Doppler effect as mentioned above, it is possible to neglect the influence. Therefore, the following formula (2) is satisfied.

$$fe_1 = fe_2 \qquad (2)$$

The relative speed calculating unit 2060 can calculate fs1 as shown in the following formula (3) which is introduced from the formula (1) and the formula (2).

$$fs_1 = fe_1 + \alpha \qquad (3)$$
$$= fe_2 + \alpha$$

Then, by inputting fs1, fs2, magnitude Vo of the speed component, which is directed toward the signal outputting apparatus 3000, out of the moving speed of the underwater vehicle 4000, and a speed Vs of the sound signal (sound speed) into the following formula (4), the relative speed calculating unit 2060 calculates a relative speed Vr of the underwater vehicle 4000 toward the signal outputting apparatus 3000.

$$Vr = \frac{fs_1 - fs_2}{fs_2} \cdot (Vs - Vo) \qquad (4)$$

Here, the frequencies of the sound signal and the electromagnetic wave signal which are outputted by the signal outputting apparatus 3000 may be identical to each other or may be different from each other. However, it is preferable that the frequencies of the sound signal and the electromagnetic wave signal are identical to each other. As mentioned above, by calculating the frequency of the electromagnetic wave signal which is received by the electromagnetic wave receiving unit 2020, the relative speed calculating unit 2060 can calculate the frequency of the electromagnetic wave signal which is outputted by the signal outputting apparatus 3000. Here, in the case that the signal outputting apparatus 3000 outputs the electromagnetic wave signal and the sound signal which have the same frequency, by calculating the frequency of the electromagnetic wave signal which the electromagnetic wave receiving unit 2020 receives, the relative speed calculating unit 2060 can calculate both of the frequencies of the electromagnetic wave signal and the sound signal which are outputted by the signal outputting apparatus 3000. Accordingly, it is unnecessary for the relative speed calculating unit 2060 to calculate the frequency of the sound signal furthermore. As a result, it is possible to acquire an effect that it is possible to implement the relative speed calculating unit 2060 with ease, and it is possible to shorten a process time of the relative speed calculating unit 2060.

Furthermore, the signal outputting apparatus 3000 may output a plurality of sound signals which have frequencies different from each other. The signal outputting apparatus 3000 may output the plural sound signals at the same time or at different times. In this case, the signal outputting apparatus 3000 outputs also a plurality of electromagnetic wave signals which have frequencies different from each other. Here, the signal outputting apparatus sets a combination of the sound signal and the electromagnetic wave signal so as to have an identical frequency. For example, it is assumed that the signal outputting apparatus outputs three sound signals whose frequencies are f1, f2 and f3 respectively. In this case, frequencies of the plural electromagnetic wave signals, which the signal outputting apparatus 3000 outputs, are f1, f2 and f3 respectively.

An underwater propagation distance of the electromagnetic wave signal or the sound signal becomes long as the frequency of the signal becomes low. On the other hand, a process which the measurement apparatus 2000 carries out becomes accurate as the frequency of the signal become high. Accordingly, a balance of the propagation distance and the accuracy of process is important. Then, the signal outputting apparatus 3000 outputs a plurality of sound signals which have frequencies different from each other, and a plurality of electromagnetic wave signals which have frequencies different from each other. Afterward, out of the combinations of the sound signal and the electromagnetic wave signal which are received, the measurement apparatus 2000 selects a combination which has the highest frequency, and calculates the relative speed regarding the combination. By virtue of the above-mentioned calculation, it is possible to calculate the relative speed with high level accuracy with balancing the propagation distance and the accuracy of process according to the underwater environment.

Here, since the sound signal, which the measurement apparatus 2000 receives, suffers from the Doppler effect, the frequencies of the sound signal and the electromagnetic wave signal, which are received by the measurement apparatus 2000, are different from each other. Then, for example, in the case of the above-mentioned example, a difference between the frequencies f1 and f2, and a difference between the frequencies f2 and f3 are set so that the differences may be quite larger than the Doppler frequency shift of the sound signal. By virtue of the above-mentioned setting, the measurement apparatus 2000 can identify the sound signal, whose frequency is nearly equal to the frequency of the electromagnetic wave signal, as a sound signal which should be combined with the electromagnetic wave signal.

<Hardware Configuration>

Each function implementing unit of the measurement apparatus 2000 may be realized by a hardware component (example: hardware-wired electronic circuit or the like) which realizes each function implementing unit or may be realized by a combination of hardware component and software component (example: combination of an electronic circuit and a program which controls the electronic circuit).

<<Example of Hardware Configuration of Measurement Apparatus 2000>>

Figure 5:
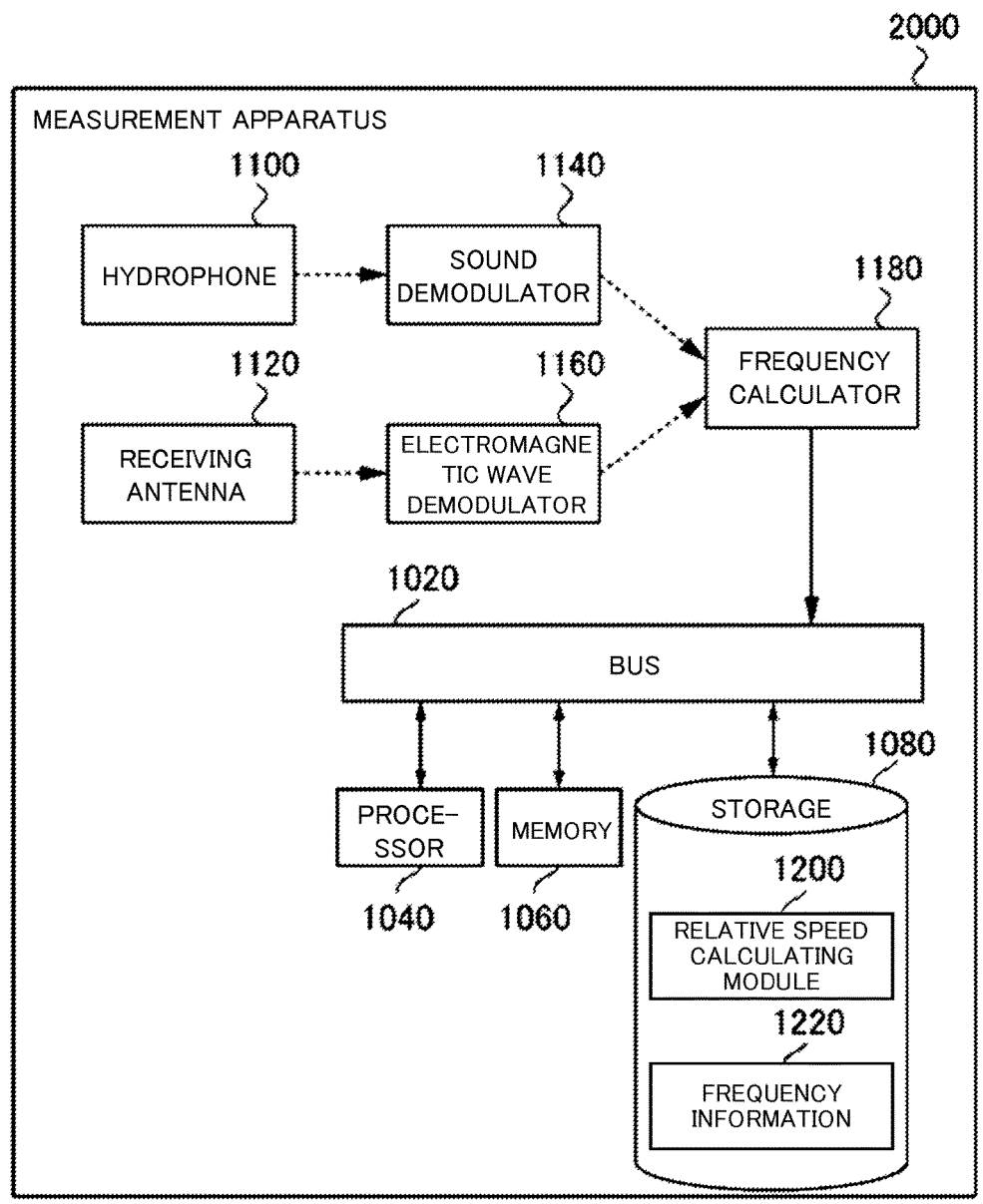
FIG. 5 is a diagram exemplifying conceptually a hardware configuration of the measurement apparatus according to the exemplary embodiment 1.

FIG. 5 is a diagram exemplifying conceptually a hardware configuration of the measurement apparatus 2000 according to the exemplary embodiment 1. A hydrophone 1100 is a mechanism which receives the sound signal and which is used for realizing the sound receiving unit 2040. A receiving antenna 1120 is a mechanism which receives the electromagnetic wave signal and which is used for realizing the electromagnetic wave receiving unit 2020. The sound signal which is received by the hydrophone 1100 is demodulated by a sound demodulator 1140, and the output of the sound demodulator 1140 is inputted into a frequency calculator 1180. Moreover, the electromagnetic wave signal which is received by the receiving antenna 1120 is demodulated by an electromagnetic wave demodulator 1160, and the output of the electromagnetic wave demodulator 1160 is inputted into the frequency calculator 1180. The frequency calculator 1180 is a mechanism which calculates a frequency of an inputted signal and which is used for realizing the frequency calculating unit 2050. Here, hardware components, which realize the hydrophone 1100, the receiving antenna 120, the sound demodulator 1140, the electromagnetic wave demodulator 1160 and the frequency calculator 1180 respectively, are components which have been known already. Therefore, explanation on each of the hardware components, which realize these mechanisms, is omitted.

A storage 1080, which is a storage such as ROM (Read Only Memory), a hard disk or the like, stores a relative speed calculating module 1200 and frequency information 1220. The relative speed calculating module 1200 is a program for realizing the relative speed calculating unit 2060. The frequency information 1220 is information which indicates a relation between the first frequency and the second frequency.

A bus 1020 is a data transmission path on which a processor 1040, a memory 1060, the storage 1080 and the frequency calculator 1180 send and receive data mutually. However, a method for connecting the processor 1040 and the like mutually is not limited to the bus connection. The processor 1040 is an arithmetic processing apparatus such as CPU (Central Processing Unit), GPU (Graphics Processing Unit) or the like. The memory 1060 is a memory such as RAM (Random Access Memory), ROM (Read Only Memory) or the like.

The processor 1040 realizes a function of the relative speed calculating unit 2060 by carrying out the relative speed calculating module 1200. The relative speed calculating module 1200 calculates the relative speed by use of each frequency which is calculated by the frequency calculator 1180, and the frequency information 1220.

Here, a hardware configuration of the measurement apparatus 2000 is not limited to the configuration shown in FIG. 5. For example, the relative speed calculating unit 2060 may be realized not by a combination of processors or the like but by the wired logic. In this case, the measurement apparatus 2000 may not include the bus 1020, the processor 1040, the memory 1060 and the storage 1080. Moreover, the frequency information 1220 may be included in the relative speed calculating module 1200. Moreover, a function of the frequency calculator 1180, which calculates the frequency, may be realized by the wired logic, and may be realized by a combination of a processor or the like, and a program.

<<Example of Hardware Configuration of Signal Outputting Apparatus 3000>>

Figure 6:
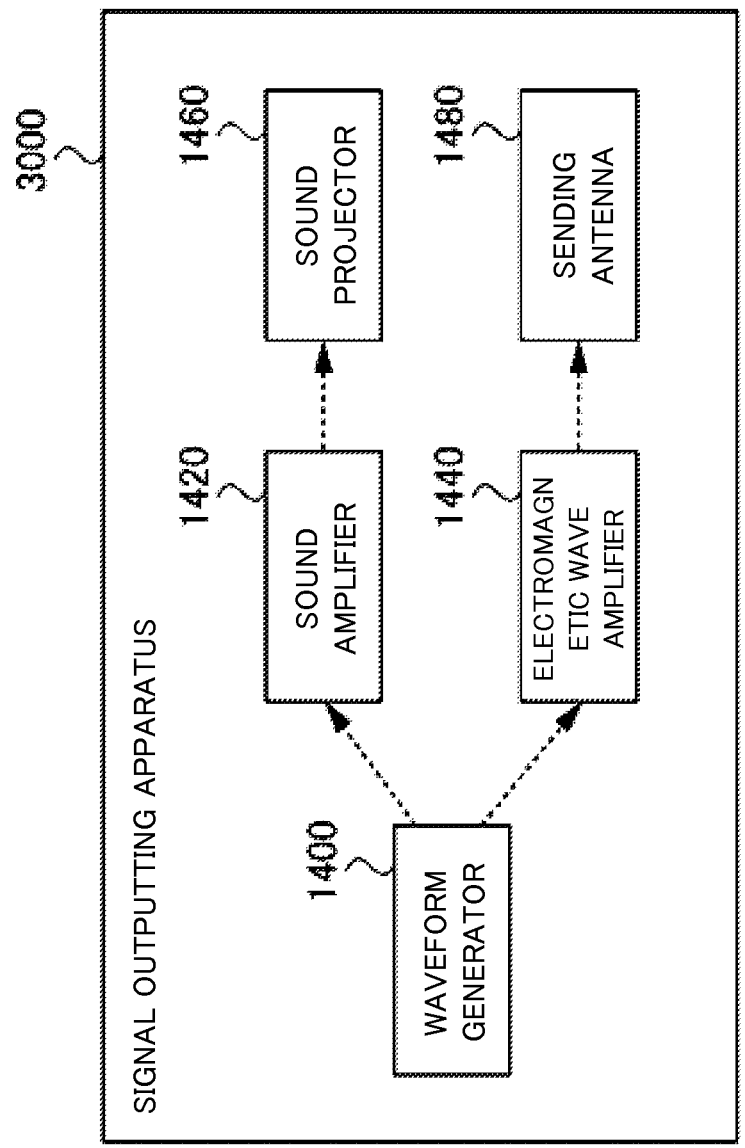
FIG. 6 is a diagram exemplifying conceptually a hardware configuration of a signal outputting apparatus according to the exemplary embodiment 1.

FIG. 6 is a diagram exemplifying conceptually a hardware configuration of the signal outputting apparatus 3000 according to the exemplary embodiment 1. A waveform generator 1400 is a mechanism which generates a waveform. The waveform which the waveform generator 1400 generates is, for example, a sine wave or a cosine wave. A sound amplifier 1420 is a mechanism which amplifies the waveform outputted by the waveform generator 1400 to generate the sound signal. An electromagnetic wave amplifier 1440 is a mechanism which amplifies the waveform outputted by the waveform generator 1400 to generate the electromagnetic wave signal. A sound projector 1460 is a mechanism which outputs the sound signal generated by the sound amplifier 1440 to the outside of the signal outputting apparatus 3000. A sending antenna 1480 is a mechanism which outputs the electromagnetic wave signal generated by the electromagnetic wave amplifier 1440. The electromagnetic wave receiving unit 2020 receives the electromagnetic wave signal which is outputted by the sending antenna 1480. Here, hardware components, which realize the waveform generator 1400, the sound amplifier 1420, the electromagnetic wave amplifier 1440, the sound projector 1460 and the sending antenna 1480 respectively, are components which have been known already. Therefore, explanation on each of the hardware components, which realize these mechanisms, is omitted.

Here, the sound signal which is outputted by the sound projector 1460 is corresponding to the sound signal which is received by the sound receiving unit 2040. Moreover, the electromagnetic wave signal which is outputted by the sending antenna 1480 is corresponding to the electromagnetic wave signal which is received by the electromagnetic wave receiving unit 2020.

Here, a hardware configuration of the signal outputting apparatus 3000 is not limited to the configuration shown in FIG. 6. For example, the waveform generator 1400 may be included in both of the sound amplifier 1420 and the electromagnetic wave amplifier 1440.

Exemplary Embodiment 2

Figure 7:
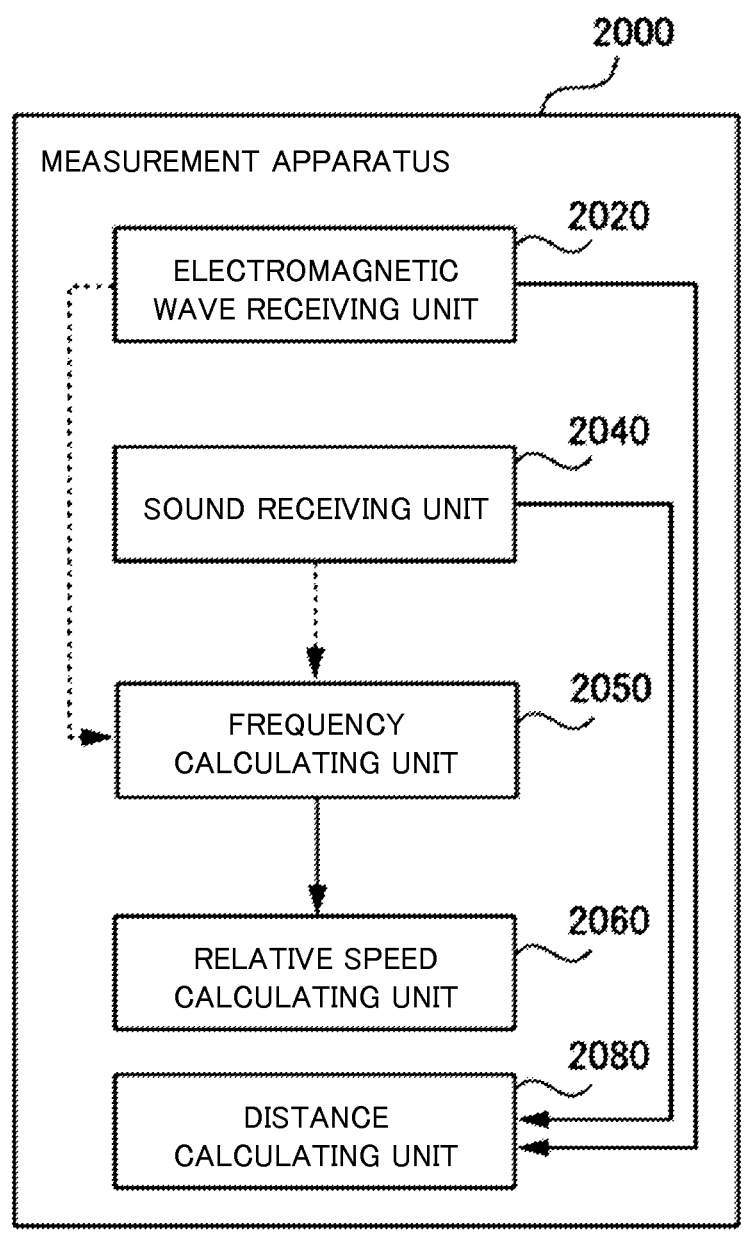
FIG. 7 is a block diagram exemplifying a measurement apparatus according to an exemplary embodiment 2.

FIG. 7 is a block diagram exemplifying the measurement apparatus 2000 according to an exemplary embodiment 2. In FIG. 7, a direction of an arrow written in a solid line indicates a flow of information, and a direction of an arrow written in a dotted line indicates a flow of signal. Furthermore, in FIG. 7, each block indicates a component not in an unit of hardware but in an unit of function.

In the exemplary embodiment 2, the signal outputting apparatus 3000 outputs the electromagnetic wave signal and the sound signal as an intermittent wave signal. Here, a timing when the signal outputting apparatus 3000 outputs the electromagnetic wave signal is denoted as a first timing, and a timing when outputting the sound signal is denoted as a second timing. The first timing and the second timing may be identical to each other or may be different from each other.

The measurement apparatus 2000 of the exemplary embodiment 2 includes a distance calculating unit 2080. The distance calculating unit 2080 calculates a distance between the underwater vehicle 4000 and the signal outputting apparatus 3000. Specifically, the distance calculating unit 2080 calculates the above-mentioned distance on the basis of a relation between the first timing and the second timing, and a difference between a timing when the electromagnetic wave signal is received by the electromagnetic wave receiving unit 2020, and a timing when the sound signal is received by the sound receiving unit 2040.

As mentioned above, the speeds of the sound signal and the electromagnetic wave signal are different each other. In the case that a period of time from the signal outputting apparatus 3000's outputting a signal up to the measurement apparatus 2000's receiving the signal is defined as a propagation time, a propagation time of the sound signal and a propagation time of the electromagnetic wave signal are different from each other. Moreover, the difference in the propagation time depends on the distance between the underwater vehicle 4000 and the signal outputting apparatus 3000. Then, the distance calculating unit 2080 calculates the distance between the signal outputting apparatus 3000 and the underwater vehicle 4000 on the basis of the difference in the propagation time.

Specific Example

Figure 8:
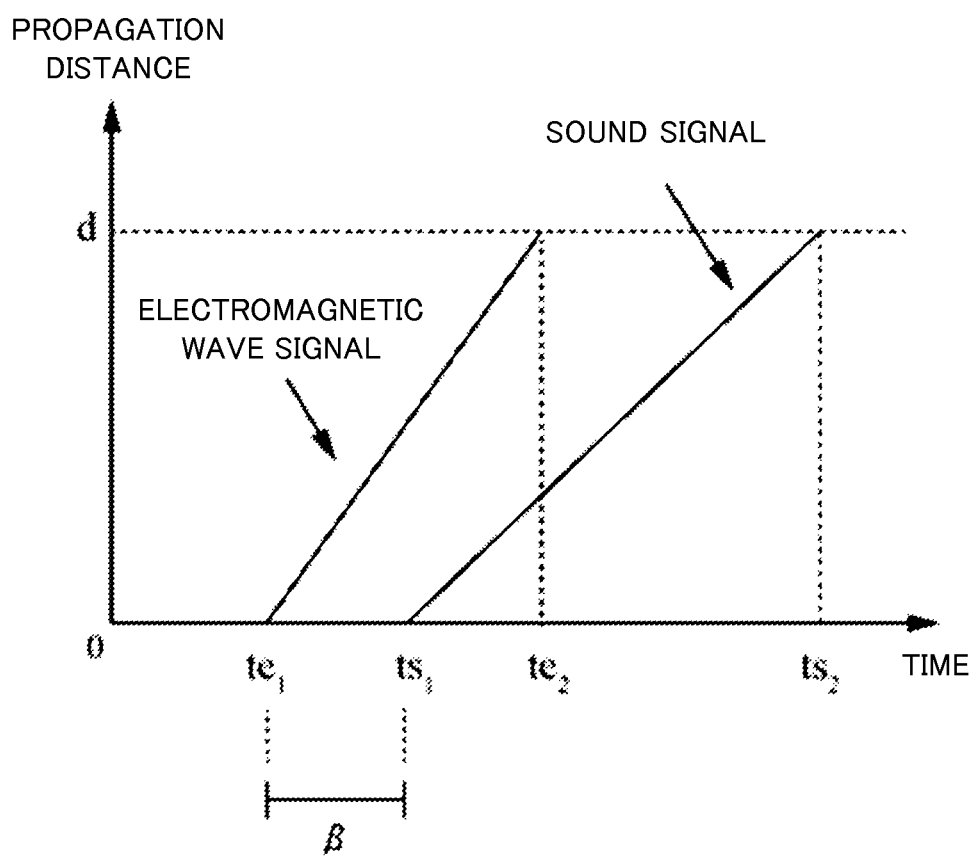
FIG. 8 is a graph showing a relation between a propagation distance and a time regarding a sound signal and an electromagnetic wave signal.

FIG. 8 is a graph showing a relation between a time and a propagation time regarding the sound signal and the electromagnetic wave signal. In FIG. 8, ts1 indicates a point of time when the signal outputting apparatus 3000 outputs a sound signal. Ts2 indicates a point of time when the measurement apparatus 2000 receives the sound signal. Te1 indicates a point of time when the signal outputting apparatus 3000 outputs an electromagnetic wave signal. Te2 indicates a point of time when the measurement apparatus 2000 receives the electromagnetic wave signal.

The distance calculating unit 2080 knows a relation between ts1 and te1 in advance. For example, it is assumed that the relation between ts1 and te1 is expressed as the following formula (5). Here, for example, the distance calculating unit 2080 stores information, which indicates the formula 5, in a storage unit of the measurement apparatus 2000. Here, the relation between ts1 and te1 may be expressed with a way other than the way using subtraction.

$$ts_1 - te_1 = \beta \tag{5}$$

The distance calculating unit 2080 can calculate a difference p between the propagation time (ts2−ts1) of the sound signal, and the propagation time (te2−te1) of the electromagnetic wave signal on the basis of the following formula (6).

$$p = (ts_2 - ts_1) - (te_2 - te_1) \tag{6}$$
$$= ts_2 - te_2 - \beta$$

Moreover, a relation among a distance d between the signal outputting apparatus 3000 and the underwater vehicle 4000, a speed Vs of the sound signal, a speed Ve of the electromagnetic wave signal and the time difference p is expressed as the following formula (7).

$$\frac{d}{Vs} - \frac{d}{Ve} = p \tag{7}$$

The distance calculating unit 2080 can calculate the distance d on the basis of the following formula (8) which is introduced from the formula (6) and the formula (7).

$$d = \frac{Ve \cdot Vs}{Ve - Vs} \cdot p \tag{8}$$
$$= \frac{Ve \cdot Vs}{Ve - Vs} \cdot (ts_2 - te_2 - \beta)$$

Here, the signal outputting apparatus 30000 may output the sound signal and the electromagnetic wave signal at the same time or at different times.

<Use of Intermittent Wave>

According to the exemplary embodiment 2, the electromagnetic wave signal and the sound signal are outputted as the intermittent wave. The reason for using the intermittent wave is that, by recognizing delimitation of the signal, each of the electromagnetic receiving unit 2020 and the sound receiving unit 2040 can specify timing at which each of the electromagnetic receiving unit 2020 and the sound receiving unit 2040 receives the signal.

Figure 9A:
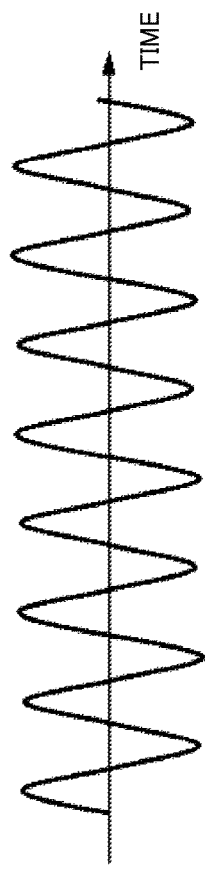
FIG. 9A and FIG. 9B are diagrams showing conceptually a method for specifying timing when an electromagnetic wave receiving unit receives the electromagnetic wave signal.
Figure 9B:
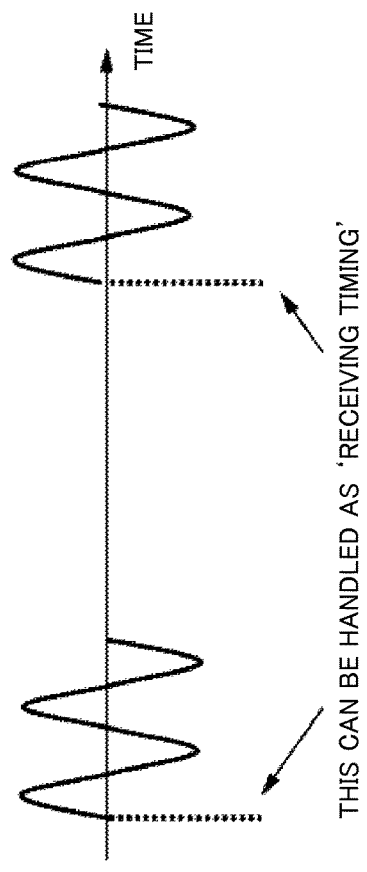

FIG. 9A and FIG. 9B are diagrams showing conceptually a method for specifying the timing when the electromagnetic wave receiving unit 2020 receives the electromagnetic wave signal. FIG. 9A is a diagram showing a case that the electromagnetic wave signal is outputted continuously as a sine wave. In this case, the electromagnetic receiving unit 2020 cannot know when the electromagnetic receiving unit 2020 receives the electromagnetic wave signal.

In contrast, FIG. 9B is a diagram showing a case that the electromagnetic wave signal is outputted as the intermittent wave. In this case, the electromagnetic wave receiving unit 2020 can specify a point of time, at which the electromagnetic wave receiving unit 2020 transits from a state of not receiving the signal to a state of receiving the signal, as the timing when receiving the electromagnetic wave signal. Here, the explanation in FIG. 9A and FIG. 9B is applicable also to a case of the sound receiving unit 2040.

As mentioned above, the signal outputting apparatus 3000 outputs the signals as the intermittent wave, and consequently each of the electromagnetic receiving unit 2020 and the sound receiving unit 2040 can specify the timing when receiving the signal.

However, in the case that a time interval at which the intermittent wave is outputted is too short, it is impossible to associate the intermittent wave which is received by the electromagnetic wave receiving unit 2020, and the intermittent wave which is received by the sound receiving unit 2040. For example, a first intermittent wave which is received by the electromagnetic wave receiving unit 2020 may be corresponding to a first intermittent wave which is received by the sound receiving unit 2040 or may be corresponding to a second intermittent wave which is received by the sound receiving unit 2040. Therefore, it is desirable that the signal outputting apparatus 3000 outputs the intermittent wave at an appropriate time interval.

Here, a continuation time of the intermittent wave has any time length. A continuation time of the intermittent electromagnetic wave signal and a continuation time of the intermittent sound signal may be identical to each other and may be different from each other.

<Work and Effect>

According to the present exemplary embodiment, it is possible to calculate the distance between the signal outputting apparatus 3000 and the underwater vehicle 4000 by using two signals of the electromagnetic wave signal and the sound signal. Moreover, according to the present exemplary embodiment, differently from the conventional method of measuring the distance on the basis of the round trip time of the signal, it is unnecessary for the measurement apparatus 2000 to send a signal. Accordingly, it is possible to simplify the configuration of the measurement apparatus 2000. As a result, it is also possible to reduce power consumption and a manufacturing cost of the measurement apparatus 2000, and furthermore it is possible to miniaturize the measurement apparatus 2000. By reducing power consumption of the underwater vehicle 4000, it is possible to reduce frequency of charging a battery of the underwater vehicle 4000. Moreover, since a life of the battery is lengthened, it is possible to reduce frequency of exchanging the battery.

Here, as one of the conventional methods, there is a method of grasping a three-dimensional position of the underwater vehicle 4000 by arranging three or more signal sending apparatuses which are called the pinger. But, according to the method, it is necessary to arrange the pingers in advance, and furthermore to grasp a position of each pinger. Therefore, an installation cost and a maintenance cost of the pinger are caused. According to the present exemplary embodiment, by arranging the signal outputting apparatus 3000 in the platform, and arranging the measurement apparatus 2000 in the underwater vehicle 4000, it is possible to grasp the distance between the signal outputting apparatus 3000 and the underwater vehicle 4000. Accordingly, a cost for providing the mechanism, which grasps the position of the underwater vehicle 4000, becomes cheap in comparison with the conventional method which uses the pingers arranged at plural points.

Exemplary Embodiment 3

Similarly to the measurement apparatus 2000 of the exemplary embodiment 2, the measurement apparatus 2000 of an exemplary embodiment 3 is shown in FIG. 7.

In the exemplary embodiment 3, the electromagnetic wave signal which the signal outputting apparatus 3000 outputs includes a first waveform. The sound signal which the signal outputting apparatus 3000 outputs includes a second waveform. Moreover, the signal outputting apparatus 3000 outputs the first waveform of the electromagnetic wave signal at a third timing, and outputs the second waveform of the sound signal at a fourth timing.

The distance calculating unit 2080 of the exemplary embodiment 3 calculates the distance between the underwater vehicle 4000 and the signal outputting apparatus 3000 on the basis of a relation between the third timing and the fourth timing, and a difference between a timing when the first waveform of the electromagnetic wave signal is received by the electromagnetic wave receiving unit 2020, and a timing when the second waveform of the sound signal is received by the sound receiving unit 2040.

An operational principle of the measurement apparatus 2000 of the exemplary embodiment 3 is the same as the operational principle of the measurement apparatus 2000 of the exemplary embodiment 2. However, the exemplary embodiment 3 is different from the exemplary embodiment 2 in a method for specifying timing when receiving the signal. As mentioned above, in the case of the exemplary embodiment 2, the intermittent wave is used as the signal. Therefore, the measurement apparatus 2000 can judge that a time, at which the measurement apparatus 2000 transits from a state of not receiving the signal to a state of receiving the signal, is a delimitation time point of the signal.

Figure 10:
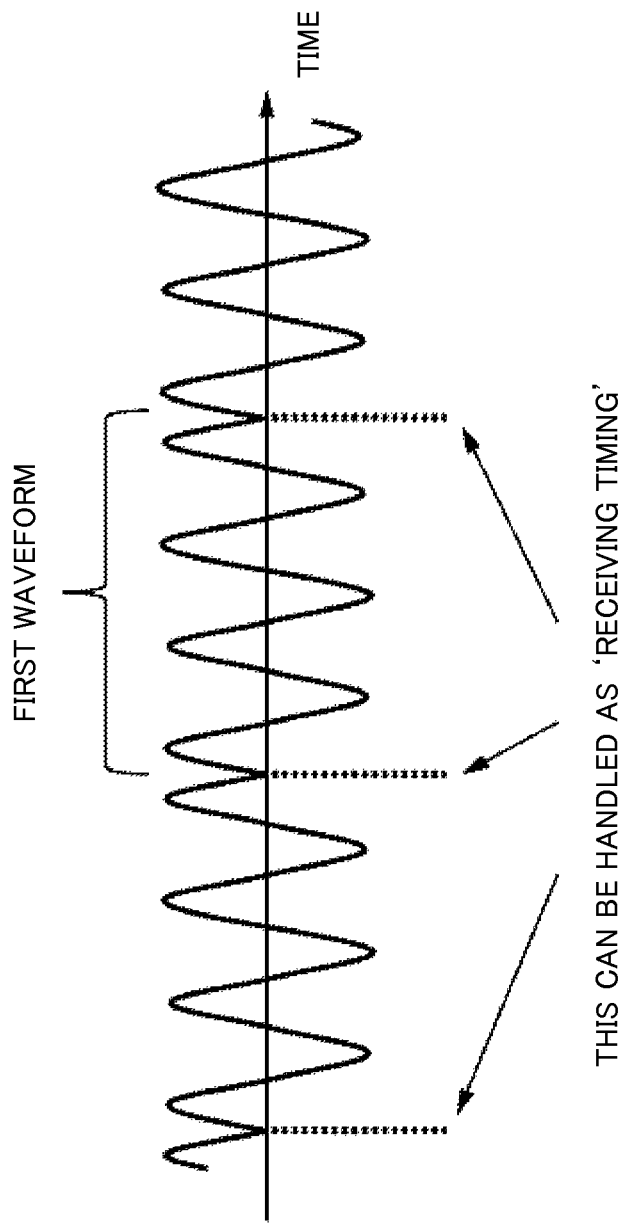
FIG. 10 is a diagram showing an electromagnetic wave signal composed of a first waveform whose delimitation is recognizable.

In contrast, the signal outputting apparatus 3000 sets a shape of the first waveform so that a delimitation of the electromagnetic signal may be recognizable. Moreover, the signal outputting apparatus 3000 sets a shape of the second waveform so that a delimitation of the sound signal may be recognizable. FIG. 10 is a diagram showing the electromagnetic wave signal composed of the first waveform whose delimitation is recognizable. In the case of FIG. 10, the measurement apparatus 2000 can recognize that a point indicated by a dotted line is corresponding to the delimitation time point of the waveform.

Here, the first waveform and the second waveform may be identical to each other or may be different from each other.

<Work and Effect>

According to the present exemplary embodiment, it is possible to acquire an effect which is the same as the effect of the exemplary embodiment 2.

Exemplary Embodiment 4

Figure 11:
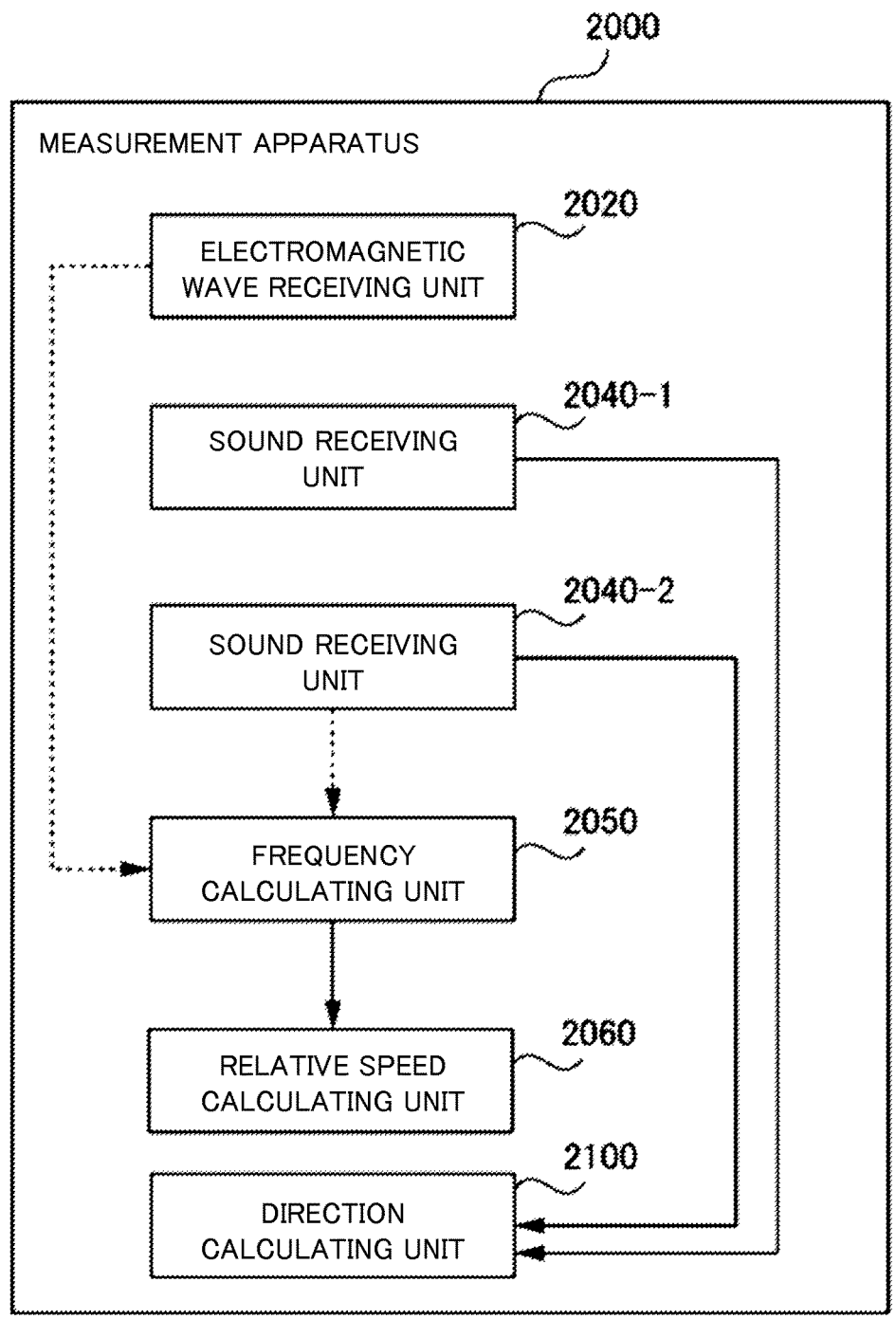
FIG. 11 is a block diagram exemplifying a measurement apparatus according to an exemplary embodiment 4.

FIG. 11 is a block diagram exemplifying a measurement apparatus according to an exemplary embodiment 4. In FIG. 11, a direction of an arrow written in a solid line indicates a flow of information, and a direction of an arrow written in a dotted line indicates a flow of signal. Furthermore, in FIG. 11, each block indicates a component not in an unit of hardware but in an unit of function.

The measurement apparatus 2000 of the exemplary embodiment 4 includes at least 2 sound receiving units 2040. In FIG. 9A and FIG. 9B, the measurement apparatus 2000 includes a sound receiving unit 2040-1 and a sound receiving unit 2040-2. Here, the sound receiving unit 2040-1 and the sound receiving unit 2040-2 are arranged at different positions in the underwater vehicle 4000.

The measurement apparatus 2000 of the exemplary embodiment 4 includes a direction calculating unit 2100. The direction calculating unit 2100 calculates a direction of the signal outputting apparatus 3000, which is viewed from the underwater vehicle 4000, on the basis of a difference between a timing when the sound signal is received by the sound receiving unit 2040-1, and a timing when the sound signal is received by the sound receiving unit 2040-2.

Figure 12A:
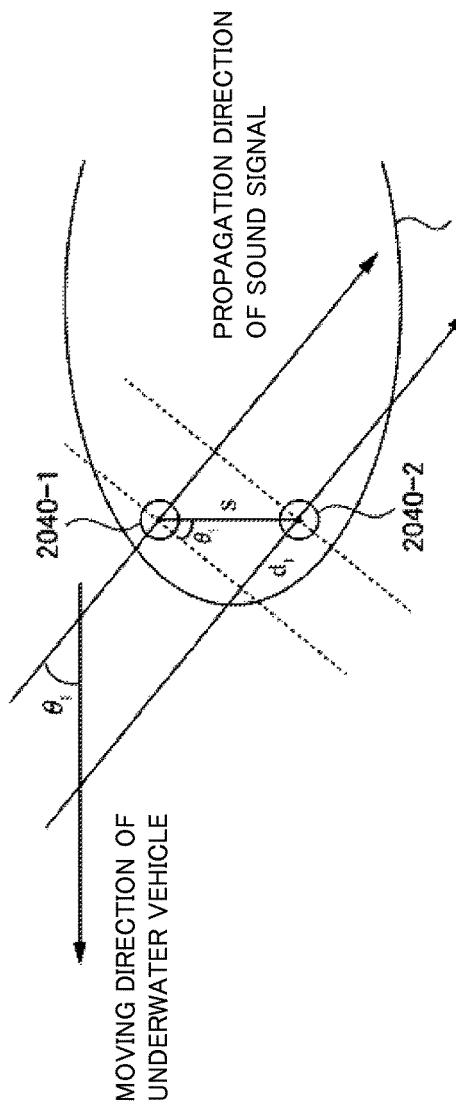
FIG. 12A and FIG. 12B are diagrams exemplifying a relation between a difference between two points of timing when two sound receiving units receive the sound signal, and a direction of a signal outputting apparatus which is viewed from the measurement apparatus.
Figure 12B:
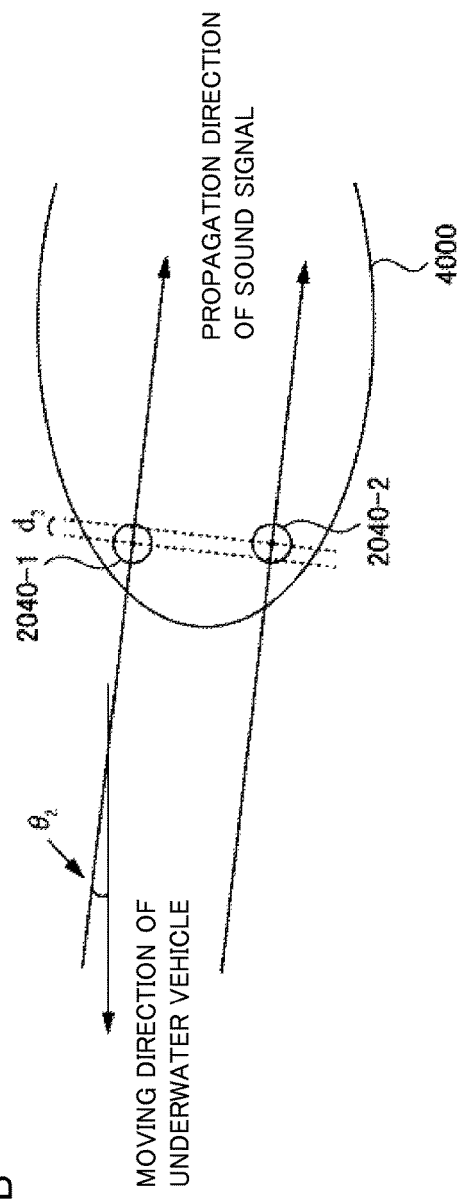

FIG. 12A and FIG. 12B are diagrams exemplifying a relation between the direction of the signal outputting apparatus 3000 which is viewed from the measurement apparatus 2000, and the difference between two kinds of timing when two sound receiving units 2040 receive the sound signal. FIG. 12A is a diagram showing a case that the signal outputting apparatus 3000 is positioned in a direction which is at an angle θ1 with a moving direction of the underwater vehicle 4000. Here, a dotted line in FIG. 12A indicates a plane wave of the sound signal.

In FIG. 12A, a position, which exists on an axis indicating a propagation direction of the sound signal and to which a position of the sound receiving unit 2040-1 is projected, is apart by a distance d1 from a position which exists on the axis and to which a position of the sound receiving unit 2040-2 is projected. Therefore, a point of time when the sound receiving unit 2040-2 receives the sound signal is delayed by d1/Vs from a point of time when the sound receiving unit 2040-1 receives the sound signal.

FIG. 12B is a diagram showing a case that the signal outputting apparatus 3000 is positioned in a direction which is at an angle θ2 with the moving direction of the underwater vehicle 4000. A dotted line in FIG. 12B indicates the plane wave of the sound signal. In FIG. 12B, a position, which exists on an axis indicating a propagation direction of the sound signal and to which a position of the sound receiving unit 2040-1 is projected, is apart by a distance d2 from a position which exists on the axis and to which a position of the sound receiving unit 2040-2 is projected. That is, a point of time when the sound receiving unit 2040-2 receives the sound signal is delayed by d2/Vs from a point of time when the sound receiving unit 2040-1 receives the sound signal.

Here, d1 is longer than d2. Therefore, a time difference between the time when the sound receiving unit 2040-1 receives the sound signal, and the time when the sound receiving unit 2040-2 receives the sound signal in the case of FIG. 12A is larger than the time difference in the case of FIG. 12B.

The reason why the distance shown in FIG. 12(a) and the distance d2 shown in FIG. 12(b) are different from each other is that the directions of the signal outputting apparatus 3000, which are viewed from the underwater vehicle 4000, in FIG. 12(a) and FIG. 12(b) are different from each other. Therefore, the time difference between the time when the sound receiving unit 2040-1 receives the sound signal, and the time when the sound receiving unit 2040-2 receives the sound signal depends on the direction of the signal outputting apparatus 3000 which is viewed from the underwater vehicle 4000.

Then, the measurement apparatus 2000 calculates the direction of the signal outputting apparatus 3000, which is viewed from the underwater vehicle 4000, on the basis of the difference between the timing when the sound receiving unit 2040-2 receives the sound signal, and the timing when the sound receiving unit 2040-1 receives the sound signal.

For example, in the case of FIG. 12A, a relation between the direction θ1 of the signal outputting apparatus 3000, which is viewed from the underwater vehicle 4000, and the distance d1 is expressed as the following formula (9), where s indicates a distance between the sound receiving unit 2040-1 and the sound receiving unit 2040-2.

$$d_1 = s \cdot \sin \theta_1 \tag{9}$$

Then, the direction calculating unit 2100 calculates a value of θ1 by use of d1 and s. Here, a method for calculating d1 will be explained in the following.

The timing, at which the sound receiving unit 2040 receives the sound signal, can be measured as the receiving point of time or can be measured as a phase of the sound signal, method which uses the receiving point of time, and a method which uses the phase are different from each other in a method of calculating d1.

In the case of the method which uses the receiving point of time, d1 is expressed as the following formula (10), where Δt indicates the difference between the point of time when the sound receiving unit 2040-1 receives the sound signal, and the point of time when the sound receiving unit 2040-2 receives the sound signal, and Vs indicates a speed of the sound signal.

$$d_1 = Vs \cdot \Delta t \tag{10}$$

Meanwhile, in the case of the method which uses the phase, d1 is expressed as the following formula (11), where Δθ indicates a difference between a phase of the sound signal which the sound receiving unit 2040-1 receives, and a phase of the sound signal which the sound receiving unit 2040-2 receives, and λ is a wavelength of the sound signal.

$$d_1 = \lambda \cdot \frac{\Delta \theta}{360°} \tag{11}$$

Here, the distance between the sound receiving unit 2040-1 and the sound receiving unit 2040-2 has no limitation. While the distance may have no limitation, by lengthen the distance between the sound receiving unit 2040-1 and the sound receiving unit 2040-2, the difference between the timing when the sound receiving unit 2040-2 receives the sound signal, and the timing when the sound receiving unit 2040-1 receives the sound signal becomes large, and it is difficult to receive influence of a measurement error by the large timing difference. As a result, it is possible to calculate the direction of the signal outputting apparatus 3000 accurately. However, it is necessary to pay attention to the following explanation in the case of using the phase of the sound signal.

<Regarding Case which Uses Phase>

If the distance between the position which exists on the axis indicating the propagation direction of the sound signal and to which the position of the sound receiving unit 2040-1 is projected, and the position which exists on the axis and to which the position of the sound receiving unit 2040-2 is projected is longer than one wavelength of the sound signal, the phase difference become larger than 360-. As a result, the direction calculating unit 2100 can not specify the difference between the timing when the sound receiving unit 2040-1 receives the sound signal, and the timing when the sound receiving unit 2040-2 receives the sound signal.

Then, two electromagnetic wave receiving units may be installed in the measurement apparatus 2000, and the direction of the signal outputting apparatus 3000 may be calculated on the basis of a difference between two kinds of timing when the two electromagnetic wave receiving units 2020 receive the electromagnetic wave signal. A method for calculating the direction is the same as the method in the case of using the sound signal. Since a wavelength of the electromagnetic wave signal is longer than a wavelength of the sound signal, it is possible to make the distance between two electromagnetic wave receiving units 2020 longer than the distance between two sound receiving units 2400.

Here, in the case of the sound signal which has small propagation loss, a higher frequency can be used than in the case of the electromagnetic wave signal. Even if a difference between the propagation distances (difference between propagation times) is the same, in the case that a high frequency signal is used, an observed phase difference becomes large since the high frequency signal has a short wavelength. Therefore, a direction calculated by use of the sound signal, whose observed phase difference is large, is more accurate than a direction calculated by use of the electromagnetic wave signal. Therefore, it is desirable to calculate the direction by use of the sound signal as much as possible. Then, for example, the measurement apparatus 2000 calculates the wavelength of the sound signal which the sound receiving unit 2040 receives, and judges whether the received sound signal is applicable to calculation of the direction or not. In the case that the sound signal is not applicable to calculation of the direction since the wavelength of the sound signal is long, the measurement apparatus 2000 calculates the direction by use of the electromagnetic wave signal.

Here, three or more electromagnetic wave receiving units and three or more sound receiving units may be arranged.

<Work and Effect>

According to the present exemplary embodiment, the measurement apparatus 2000 can calculate the direction of the signal outputting apparatus 3000 which is viewed from the movement direction of the underwater vehicle 4000. The calculated direction can be used, for example, for controlling the moving direction of the underwater vehicle 4000. It is assumed that the underwater vehicle 4000 returns to the platform in which the signal outputting apparatus 3000 is installed. In this case, the measurement apparatus 2000 checks the direction of the platform periodically or non-periodically, and controls the underwater vehicle 4000 to move in the direction of the platform. As a result, it is possible that the underwater vehicle 4000 moves toward the platform correctly without useless movement. As a result, the underwater vehicle 4000 can return to the platform efficiently without using energy uselessly. Accordingly, it is possible to reduce power consumption of the battery of the underwater vehicle 4000. Moreover, it is possible to shorten a time required for the underwater vehicle 4000's returning to the platform.

<Modification>

Figure 13:
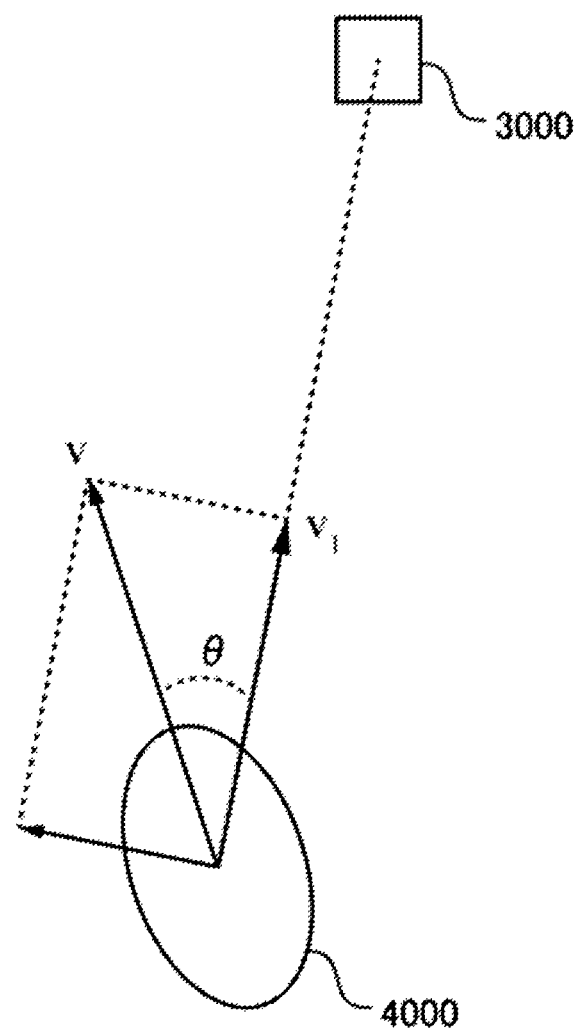
FIG. 13 is a diagram showing a relation among a speed of the underwater vehicle, a calculated relative speed and a direction of the signal outputting apparatus.

The direction calculating unit 2100 may calculate the direction of the signal outputting apparatus 3000 which is viewed from the moving direction of the underwater vehicle 3000 by use of the speed of the underwater vehicle 4000, and the relative speed which the relative speed calculating unit 2060 calculates. FIG. 13 is a diagram showing a relation among the speed of the underwater vehicle 4000, the calculated relative speed and the direction of the signal outputting apparatus 3000. Here, the direction calculating unit 2100 regards that the signal outputting apparatus 3000 does not move. Therefore, the relative speed, which is calculated by the relative speed calculating unit 2060, is equal to a speed component v1, which is directed toward the signal outputting apparatus 3000, out of the speed of the underwater vehicle 4000. Here, it is assumed that the speed of the underwater vehicle 4000 is v, and the direction of the signal outputting apparatus 3000, which is viewed from the moving direction of the underwater vehicle 4000, is θ. In this case, the following formula (12) is satisfied.

$$|v_1|=|v|\cdot\cos\theta \qquad (12)$$

Then, the direction calculating unit 2100 calculates the direction θ on the basis of the above-mentioned formula. Here, in the case that the relative speed has a negative value (in the case that the underwater vehicle 4000 becomes far from the signal outputting apparatus 3000), the direction of the signal outputting apparatus 3000 is expressed as (θ+90−).

Here, according to the method, in the case that the direction is calculated only one time, it is impossible to judge whether the signal outputting apparatus 3000 is positioned in a diagonally right direction or is positioned in a diagonally left direction when viewing from the moving direction of the underwater vehicle 4000. In the case that it is desired to carry out the judgment, for example, the measurement apparatus 2000 calculates the direction θ, and afterward changes the moving direction of the underwater vehicle 4000 to calculate the direction θ again. Then, on the basis of a difference between values of the direction θ which are calculated before and after changing the moving direction, it is judged whether the signal outputting apparatus 3000 is positioned in the diagonally right direction or is positioned in the diagonally left direction when viewing from the moving direction of the underwater vehicle 4000. For example, it is assumed that the direction which is calculated first time is 40−, and the direction which is calculated again after rotating in the left direction is 60−. In this case, it is found that the signal outputting apparatus 3000 is positioned in the diagonally right direction when viewing from the moving direction of the underwater vehicle 4000.

Exemplary Embodiment 5

Figure 14:
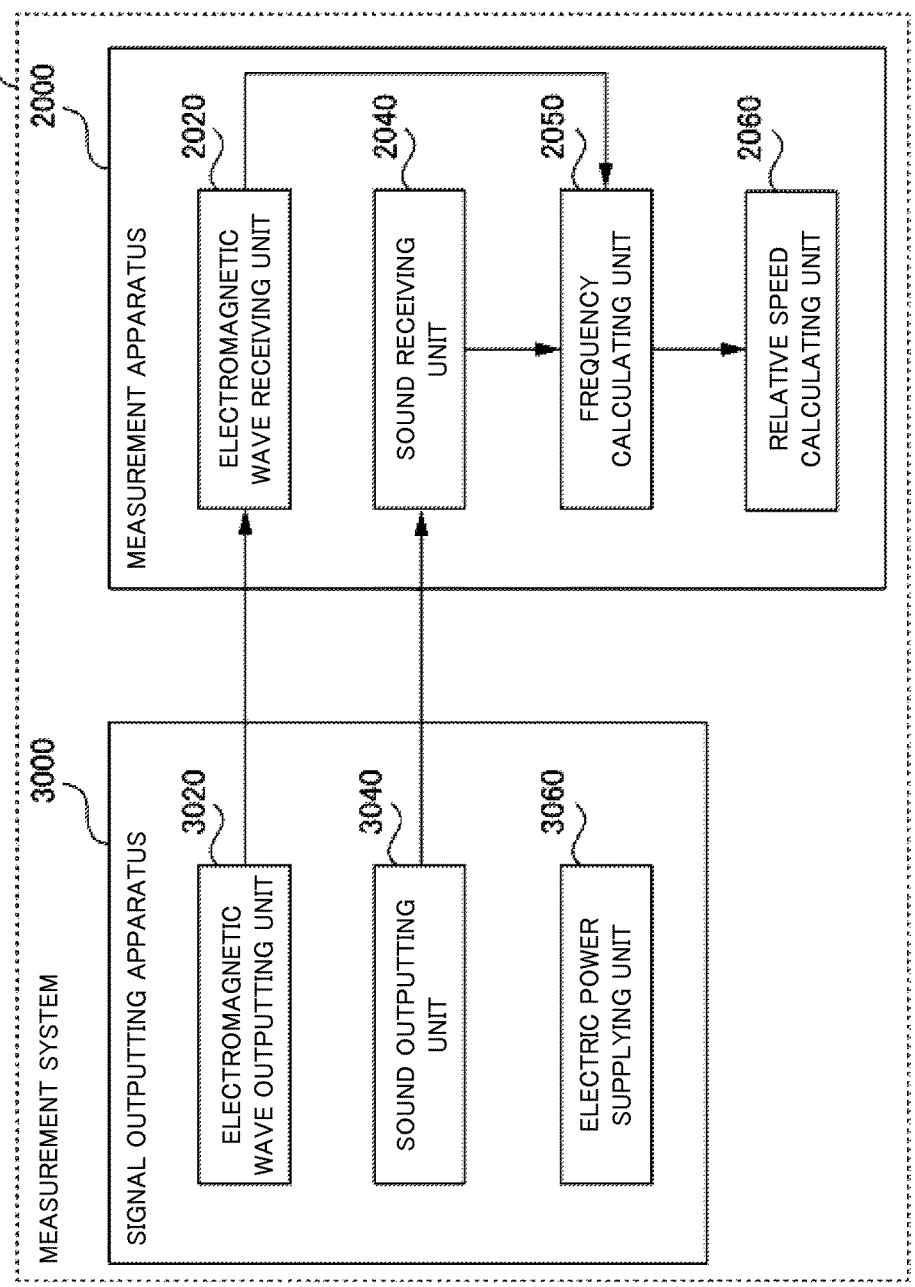
FIG. 14 is a block diagram exemplifying a measurement system according to an exemplary embodiment 5.

FIG. 14 is a block diagram exemplifying a measurement system 5000 according to an exemplary embodiment 5. In FIG. 14, a direction of an arrow written in a solid line indicates a flow of information, and a direction of an arrow written in a dotted line indicates a flow of signal. Furthermore, in FIG. 14, each block indicates a component not in an unit of hardware but in an unit of function.

The measurement apparatus 2000 according to the exemplary embodiment 5 is the same as the measurement apparatus 2000 according to any one of the exemplary embodiments 1 to 4. FIG. 14 shows a case of using the measurement apparatus 2000 according to the exemplary embodiment 1

The signal outputting apparatus 3000 according to the exemplary embodiment 5 includes an electromagnetic wave outputting unit 3020, a sound outputting unit 3040 and an electric power supplying unit 3060. The electromagnetic wave outputting unit 3020 outputs an electromagnetic wave signal which is received by the electromagnetic wave receiving unit 2020. The sound outputting unit 3040 outputs a sound signal which is received by the sound receiving unit 2040. The power supplying unit 3060 sends an electromagnetic wave signal which is used for the non-contact type electric power supply.

Here, the electromagnetic wave outputting unit 3020 and the electric power supplying unit 3060 are configured so as to have a common part partially. For example, the electromagnetic wave outputting unit 3020 and the electric power supplying unit 3060 share a coil for generating the electromagnetic wave signal or an antenna for sending the electromagnetic wave signal.

<Work and Effect>

In the present exemplary embodiment, the signal outputting apparatus 3000 sends not only the electromagnetic wave signal and the sound signal, which are used for the measurement carried out by the measurement apparatus 2000, but also the electromagnetic wave signal which is used for the non-contact type electric power supply. It is possible to use the signal outputting apparatus 3000 for the measurement carried out by the measurement apparatus 2000 and for the non-contact type electric power supply to any apparatus. Moreover, the electromagnetic wave outputting unit 3020 and the electric power supplying unit 3060 are configured so as to have a common part partially. Therefore, it is possible to reduce a manufacturing cost, a size and electric power consumption of the signal outputting apparatus 3000.

As mentioned above, in general, the underwater vehicle works by using a battery. As a method for charging the battery of the underwater vehicle, the non-contact type electric power supply is more suitable than the contact type electric power supply. The reason is that, in the case of using the contact type electric power supply, it is conceivable that there is a possibility that water is leaked from a connection point of a charging cable or the like. Then, for example, the electric power supplying unit 3060 can be used for charging the battery of the underwater vehicle 4000. As mentioned above, with making the measurement apparatus 2000 carry out various measurement operations by use of the signal outputting apparatus 3000, it is possible to charge the battery of the underwater vehicle 4000, in which the measurement apparatus 2000 is installed, with safety.

For example, the signal outputting apparatus 3000 is arranged in the platform for the underwater vehicle 4000. When the underwater vehicle 4000 returns to the platform, the measurement apparatus 2000 carries out various measurement processes which have been explained in the exemplary embodiments 1 to 4. Then, by use of at least one out of the relative distance of the underwater vehicle 4000 toward the signal outputting apparatus 3000, the distance between the signal outputting apparatus 3000 and the underwater vehicle 4000, and the direction of the signal outputting apparatus 3000 which is viewed from the underwater vehicle 4000, the measurement apparatus 2000 can control the movement of the underwater vehicle 4000, and can make the underwater vehicle 4000 return to the platform with grasping a positional relation with the signal outputting apparatus 3000 appropriately. Here, a function (control unit) to control the movement of the underwater vehicle 4000 may be installed in another apparatus other than the measurement apparatus 2000. In this case, the measurement apparatus 2000 outputs various measurement results, and the control unit controls the underwater vehicle 4000 by use of the outputted results. As mentioned above, since it is possible to move the underwater vehicle 4000 with grasping the positional relation between the underwater vehicle 4000 and the signal outputting apparatus 3000 appropriately, it is possible to use energy of the battery of the underwater vehicle 4000 with no waste. Then, the battery of the underwater vehicle 4000, which returns to the platform, can be charged by the electric power supplying unit 3060.

While the exemplary embodiments of the present invention have been explained with reference to the drawings, the exemplary embodiments are mere examples of the present invention, and various configurations other than the above can be adopted.

REFERENCE SIGNS LIST

1020 bus
1040 processor
1060 memory
1080 storage
1100 hydrophone
1120 receiving antenna
1140 sound demodulator
1160 electromagnetic wave demodulator
1180 frequency calculator
1200 relative speed calculating module
1220 frequency information
1400 waveform generator
1420 sound amplifier
1440 electromagnetic wave amplifier
1460 sound projector
1480 sending antenna
2000 measurement apparatus
2020 electromagnetic wave receiving unit
2040 sound receiving unit
2050 frequency calculating unit
2060 relative speed calculating unit
2080 distance calculating unit
2100 direction calculating unit
3000 signal outputting apparatus
3020 electromagnetic wave outputting unit
3040 sound outputting unit
3060 electric power supplying unit
4000 underwater vehicle
5000 measurement system

The invention claimed is:

1. A measurement apparatus which is installed in an underwater vehicle, comprising:
    a receiving antenna which receives an electromagnetic wave signal, which is outputted by a signal outputting apparatus into a water with a first frequency, in the water;
    a hydrophone which receives a sound signal, which is outputted by the signal outputting apparatus into the water with a second frequency, in the water; and
    at least one hardware processor configured to:
        calculate a frequency of the electromagnetic wave signal which is received by the receiving antenna, and a frequency of the sound signal which is received by the hydrophone; and
        calculate a relative speed of the underwater vehicle on a basis of a relation between the first frequency and the second frequency, and on a basis of the frequencies of the electromagnetic wave signal and the sound signal which are calculated.

2. The measurement apparatus according to claim 1, wherein the first frequency and the second frequency are identical to each other.

3. The measurement apparatus according to claim 1, wherein
    the signal outputting apparatus outputs the electromagnetic wave signal at a first timing as an intermittent wave, and outputs the sound signal at a second timing as an intermittent wave, and wherein the at least one hardware processor is further configured to implement calculating a distance between the underwater vehicle and the signal outputting apparatus on a basis of a relation between the first timing and the second timing, and a difference between a timing when the electromagnetic wave signal is received by the receiving antenna, and a timing when the sound signal is received by the hydrophone.

4. The measurement apparatus according to claim 3, wherein the at least one hardware processor is further configured to implement controlling movement of the underwater vehicle on a basis of the distance between the underwater vehicle and the signal outputting apparatus.

5. The measurement apparatus according to claim 1, wherein
the signal outputting apparatus outputs a first waveform of the electromagnetic wave signal at a third timing, and outputs a second waveform of the sound signal at a fourth timing, and wherein
the at least one hardware processor is further configured to implement calculating a distance between the underwater vehicle and the signal outputting apparatus on a basis of a relation between the third timing and the fourth timing, and a difference between a timing when the first waveform of the electromagnetic wave signal is received by the receiving antenna, and a timing when the second waveform of the sound signal is received by the hydrophone.

6. The measurement apparatus according to claim 1, wherein the at least one hardware processor is further configured to implement calculating a direction of the signal outputting apparatus which is viewed from the underwater vehicle on a basis of the relative speed.

7. The measurement apparatus according to claim 6, wherein the at least one hardware processor is further configured to implement controlling movement of the underwater vehicle on a basis of the direction of the signal outputting apparatus which is viewed from the underwater vehicle.

8. The measurement apparatus according to claim 1, comprising:
a first sound receiver and a second sound receiver which are arranged at different positions in the underwater vehicle; and
the at least one hardware processor is further configured to implement calculating a direction of the signal outputting apparatus, which is viewed from the underwater vehicle, on a basis of a difference between a timing when the sound signal is received by the first sound receiver, and a timing when the sound signal is received by the second sound receiver.

9. The measurement apparatus according to claim 8, wherein
the at least one hardware processor is further configured to implement calculating a difference between the timing when the sound signal is received by the first sound receiver, and the timing when the sound signal is received by the second sound receiver as a difference between a phase of the sound signal which the first sound receiver receives, and a phase of the sound signal which the second sound receiver receives.

10. The measurement apparatus according to claim 1, wherein the at least one hardware processor is further configured to implement controlling movement of the underwater vehicle on a basis of the relative speed.

11. The measurement apparatus according to claim 1, wherein
the signal outputting apparatus outputs a plurality of electromagnetic wave signals, including the electromagnetic wave signal, which have frequencies different from each other, and a plurality of sound signals, including the sound signal, which have frequencies different from each other, wherein
the receiving antenna receives the plurality of electromagnetic wave signals respectively, and wherein
the hydrophone receives the plurality of sound signals respectively.

12. A measurement system, comprising:
a signal outputting apparatus; and
the measurement apparatus according to claim 1, wherein the signal outputting apparatus comprises:
a receiving antenna configured to output an electromagnetic wave signal into the water with a first frequency; and
a sound outputting unit configured to output a sound signal into the water with a second frequency.

13. The measurement system according to claim 12, wherein
the signal outputting apparatus includes an electric power supplying unit which outputs a second electromagnetic signal used for non-contact type electric power supply, and
wherein
the receiving antenna and the electric power supplying unit share a coil or an antenna.

14. A non-transitory computer-readable recording medium storing a program causing a computer to execute:
electromagnetic wave receiving processing of receiving an electromagnetic wave signal outputted by a signal outputting apparatus into a water with a first frequency;
sound receiving processing of receiving a sound signal outputted by the signal outputting apparatus into the water with a second frequency;
frequency calculating processing of calculating a frequency of the electromagnetic wave signal received by the electromagnetic wave receiving processing, and a frequency of the sound signal received by the sound receiving processing; and
relative speed calculating processing of calculating a relative speed of an underwater vehicle toward the signal outputting apparatus based on a relation between the first frequency and the second frequency, and the frequencies of the electromagnetic wave signal and the sound signal calculated by the frequency calculating processing.

15. A control method which is carried out by a measurement apparatus installed in an underwater vehicle, wherein the control method comprises:
receiving an electromagnetic wave signal, which a signal outputting apparatus outputs into a water with a first frequency, in the water;
receiving a sound signal, which the signal outputting apparatus outputs into the water with a second frequency, in the water;
calculating a frequency of the electromagnetic wave signal, and a frequency of the sound signal; and
calculating a relative speed of the underwater vehicle toward the signal outputting apparatus on a basis of a relation between the first frequency and the second frequency, and the frequencies of the electromagnetic wave signal and the sound signal.

16. The control method according to claim 15, wherein the first frequency and the second frequency are identical to each other.

17. The control method according to claim 15, wherein the signal outputting apparatus outputs the electromagnetic wave signal at a first timing as an intermittent wave, and outputs the sound signal at a second timing as an intermittent wave, and wherein the control method further comprises calculating a distance between the underwater vehicle and the signal outputting apparatus on a basis of a relation between the first timing and the second timing, and a difference between a timing when the electromagnetic wave signal, and a timing when the sound signal is received.

18. The control method according to claim 15, wherein the signal outputting apparatus outputs a first waveform of the electromagnetic wave signal at a third timing, and outputs a second waveform of the sound signal at a fourth timing, and wherein the control method further comprises calculating a distance between the underwater vehicle and the signal outputting apparatus on a basis of a relation between the third timing and the fourth timing, and a difference between a timing when the first waveform of the electromagnetic wave signal is received, and a timing when the second waveform of the sound signal is received.

19. The control method according to claim 15, comprising:

calculating a direction of the signal outputting apparatus, which is viewed from the underwater vehicle, on a basis of a speed of the underwater vehicle and the relative speed.

20. The control method according to claim 15, wherein the measurement apparatus includes a first sound receiver and a second sound receiver which are arranged at different positions in the underwater vehicle, and wherein the control method further comprises calculating a direction of the signal outputting apparatus, which is viewed from the underwater vehicle, on a basis of a difference between a timing when the sound signal is received by the first sound receiver, and a timing when the sound signal is received by the second sound receiver.

* * * * *